(12) United States Patent
Hasegawa et al.

(10) Patent No.: US 10,634,846 B2
(45) Date of Patent: Apr. 28, 2020

(54) OPTICAL MODULE

(71) Applicant: FURUKAWA ELECTRIC CO., LTD., Tokyo (JP)

(72) Inventors: Junichi Hasegawa, Tokyo (JP); Yasuyoshi Uchida, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/150,883

(22) Filed: Oct. 3, 2018

(65) Prior Publication Data

US 2019/0033526 A1    Jan. 31, 2019

Related U.S. Application Data

(63) Continuation of application No. PCT/JP2017/009877, filed on Mar. 13, 2017.

(30) Foreign Application Priority Data

Apr. 13, 2016 (JP) .................. 2016-080592

(51) Int. Cl.
*G02B 6/14* (2006.01)
*G02B 6/255* (2006.01)
(Continued)

(52) U.S. Cl.
CPC ............ *G02B 6/14* (2013.01); *G02B 6/03638* (2013.01); *G02B 6/122* (2013.01); *G02B 6/132* (2013.01); *G02B 6/2551* (2013.01); *G02B 6/30* (2013.01)

(58) Field of Classification Search
CPC .................................. G02B 6/12; G02B 6/107
See application file for complete search history.

(56) References Cited

U.S. PATENT DOCUMENTS

| 7,469,083 B2 * | 12/2008 | Todori ................. B82Y 20/00 385/14 |
| 7,529,455 B2 * | 5/2009 | Suzuki ................. B82Y 20/00 385/129 |

(Continued)

FOREIGN PATENT DOCUMENTS

| JP | 5 173030 | 7/1993 |
| JP | 2005-70284 | 3/2005 |
| WO | WO 2015/089830 A1 | 6/2015 |

OTHER PUBLICATIONS

Takahashi et al., "Development of Multicast Switch based on ZrO2—SiO2 High Delta PLC," Furukawa Electric Review, No. 135, p. 20-24, 2016. (partial English translation) (Year: 2016).*

(Continued)

*Primary Examiner* — Rhonda S Peace
(74) *Attorney, Agent, or Firm* — Oblon, McClelland, Maier & Neustadt, L.L.P.

(57) ABSTRACT

An optical module includes a single-mode optical fiber; a high relative refractive-index difference optical fiber having a larger core-to-cladding relative refractive-index difference than that of the single-mode optical fiber fusion-spliced to a first end of the high relative refractive-index difference optical fiber; a planar lightwave circuit that includes an optical waveguide having a core of quartz-based glass doped with a refractive-index raising dopant and a cladding of quartz-based glass, and is connected at a first end thereof to a second end, opposite to the first end, of the high relative refractive-index difference optical fiber; and a silicon thin-wire waveguide element that includes a silicon thin-wire waveguide having a silicon core and a cladding whose refractive index lower than that of the silicon core, and is connected to a second end, opposite to the first end, of the optical waveguide of the planar lightwave circuit.

10 Claims, 8 Drawing Sheets

(51) Int. Cl.
  *G02B 6/30* (2006.01)
  *G02B 6/036* (2006.01)
  *G02B 6/122* (2006.01)
  *G02B 6/132* (2006.01)

(56) References Cited

U.S. PATENT DOCUMENTS

| | | | | |
|---|---|---|---|---|
| 8,483,528 | B2 * | 7/2013 | Socci | G02B 6/305 385/131 |
| 8,787,712 | B2 * | 7/2014 | Grondin | B82Y 20/00 385/30 |
| 2003/0044159 | A1 | 3/2003 | Anderson | B29D 11/00721 385/142 |
| 2003/0174956 | A1 * | 9/2003 | Viens | G02B 6/1228 385/43 |
| 2007/0122085 | A1 * | 5/2007 | Takahashi | G02B 6/368 385/83 |
| 2009/0087144 | A1 * | 4/2009 | Yoshida | G02B 6/107 385/43 |
| 2015/0247974 | A1 * | 9/2015 | Painchaud | G02B 6/305 385/14 |
| 2015/0277036 | A1 * | 10/2015 | Jiang | G02B 6/12 385/43 |
| 2016/0299294 | A1 | 10/2016 | Wang et al. | |
| 2017/0242188 | A1 * | 8/2017 | Cadarso Busto | G02B 6/30 |
| 2019/0033526 | A1 * | 1/2019 | Hasegawa | G02B 6/03638 |

OTHER PUBLICATIONS

International Search Report dated Jun. 6, 2017 in PCT/JP2017/009877, filed on Mar. 13, 2017 (with English Translation).
Written Opinion dated Jun. 6, 2017 in PCT/JP2017/009877, filed on Mar. 13, 2017.
Tokushima, M. et al., "Dual-Tapered 10-µm-Spot-Size Converter with Double Core for Coupling Polarization-Independent Silicon Rib Waveguides to Single-Mode Optical Fibers," Applied Physics Express, vol. 5, 2012, pp. 3.
"Development of Multicast Switch based on $ZrO_2$—$SiO_2$ High Δ PLC" Furukawa Electric Review, No. 135, 2016, pp. 11(with Partial English Translation).
Barwicz, T. et al., "An O-band Metamaterial Converter Interfacing Standard Optical Fibers to Silicon Nanophotonic Waveguides," OFC, Th3F.3.pdf, 2015, pp. 3.
Nakamura, S. et. al., "Compact and Low-Loss 8×8 Silicon Photonic Switch Module for Transponder Aggregators in CDC-ROADM Application," OFC, M2B.6.pdf, 2015, pp. 3.

* cited by examiner

OPTICAL MODULE

CROSS-REFERENCE TO RELATED APPLICATION(S)

This application is a continuation of International Application No. PCT/JP2017/009877, filed on Mar. 13, 2017 which claims the benefit of priority of the prior Japanese Patent Application No. 2016-080592, filed on Apr. 13, 2016, the entire contents of which are incorporated herein by reference.

BACKGROUND OF THE INVENTION

1. Field of the Invention

The present invention relates to an optical module.

2. Description of the Related Art

In a silicon thin-wire waveguide, a relative refractive-index difference $\Delta$ may exceed, for example, 40%, and therefore a mode field diameter is extremely small. When the silicon thin-wire waveguide is directly connected to a normal single-mode optical fiber, a large connection loss of about 5 dB is caused due to the difference in the mode field diameter. Reduction of the connection loss due to the difference in the mode field diameter is one of technical problems to be solved in placing the silicon thin-wire waveguide into practical use.

In order to reduce this connection loss, for example, attempts have been made to provide a special structure for adjusting the mode field diameter at the end of the silicon thin-wire waveguide (see T. Barwicz, et al., "An O-band Metamaterial Converter Interfacing Standard Optical Fibers to Silicon Nanophotonic Waveguides," in Optical Fiber Communication Conference 2015, paper Th3F.3, referred to as Related Document 1 below, and S. Nakamura, et al., "Compact and Low-Loss 8×8 Silicon Photonic Switch Module for Transponder Aggregators in CDC-ROADM Application," in Optical Fiber Communication Conference 2015 paper M2B.6, referred to as Related Document 2 below.

Although it is possible to reduce the connection loss in principle by providing a special structure at the end of the silicon thin-wire waveguide as disclosed in Related Document 1 or Related Document 2, a manufacturing process of the silicon thin-wire waveguide is complicated, which causes a problem of deterioration of yield and cost increase. In addition, when attempting to connect a silicon thin-wire waveguide and a single-mode optical fiber in a multicore manner, the uniformity between the ports may be greatly deteriorated in some cases.

SUMMARY OF THE INVENTION

The present disclosure has been made in view of the above, and is directed to a solution to at least partially solve the problems in a related technology.

According to an aspect of the present disclosure, an optical module is provided which includes a single-mode optical fiber; a high relative refractive-index difference optical fiber having a larger relative refractive-index difference of a first core with respect to a first cladding than a relative refractive-index difference in the single-mode optical fiber, wherein the high relative refractive-index optical fiber is fusion-spliced at a first end surface thereof to the single-mode optical fiber; a planar lightwave circuit including an optical waveguide having a second core formed of quartz-based glass doped with a refractive index raising dopant and a second cladding formed of quartz-based glass, thereby to guide light through the second core, wherein the optical waveguide is optically connected at a first end thereof to a second end surface of the high relative refractive-index difference optical fiber, the second end surface being opposite to the first end surface of the relative refractive-index difference optical fiber; and a silicon thin-wire waveguide element including a silicon thin-wire waveguide having a third core formed of silicon and a third cladding having a refractive index lower than the refractive index of the third core, thereby to guide light through the third core, wherein the silicon thin-wire waveguide is optically connected to a second end surface of the optical waveguide of the planar lightwave circuit, the second end surface being opposite to the first end surface of the optical waveguide of the planar lightwave circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
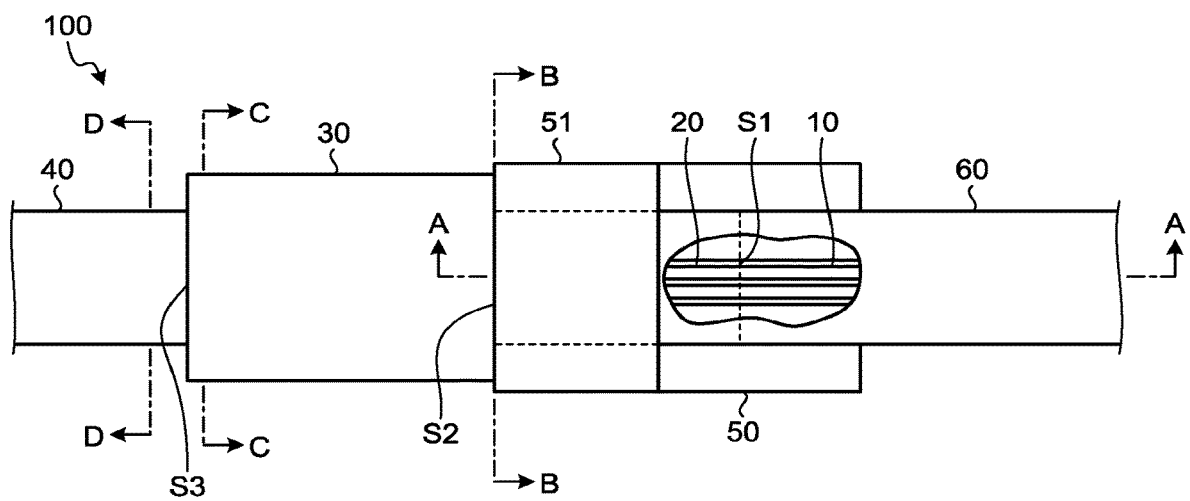
FIG. 1 is a partial cutaway view illustrating a configuration of an optical module according to a first embodiment.

Hereinafter, embodiments of optical components according to the present invention will be described with reference to the drawings. Note that the present invention is not limited by the embodiments described below. In each drawing, the same or corresponding elements are denoted by the same reference signs as appropriate. Furthermore, it should be noted that the drawings are schematic, and that the relationships and ratios of the dimensions of the elements may be different from the actual ones in some cases. Differences between dimensions and ratios of different drawings may also be included in the drawings. Terms not specifically defined in this specification shall be followed according to the definitions and measurement methods in ITU-T 6.650.1 as appropriate.

First Embodiment

Figure 2:
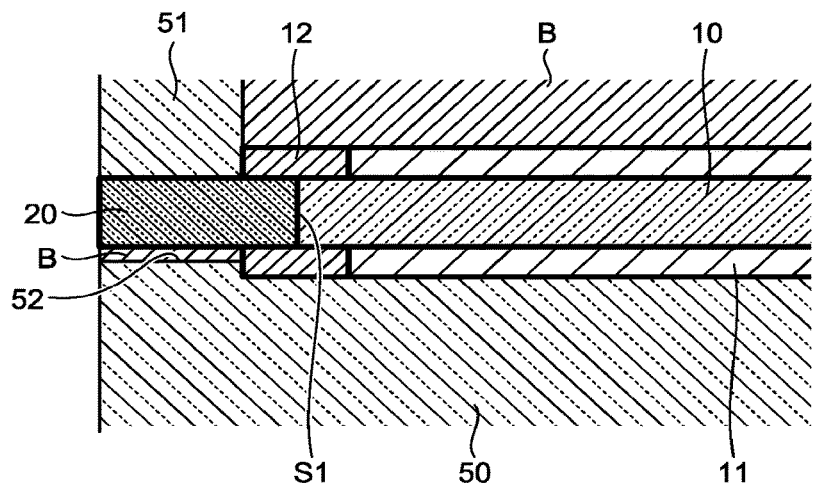
FIG. 2 is a cross-sectional view illustrating a cross section taken along line A-A in FIG. 1.
Figure 3:
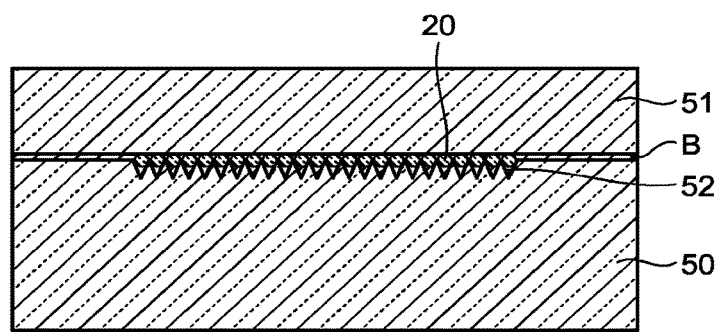
FIG. 3 is a cross-sectional view illustrating a cross section taken along line B-B in FIG. 1.
Figure 4:
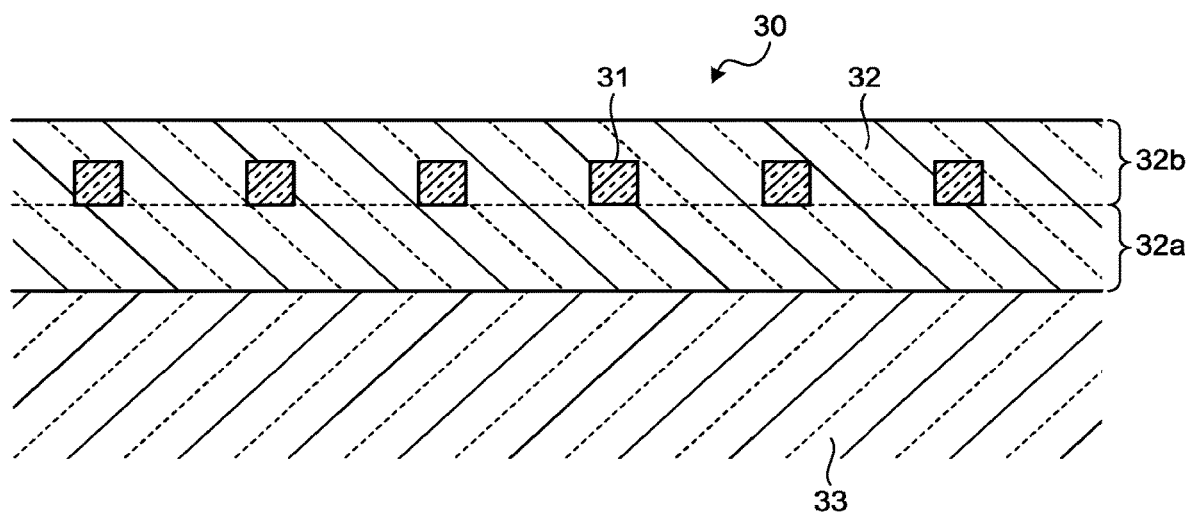
FIG. 4 is a cross-sectional view illustrating a cross section taken along line C-C in FIG. 1.
Figure 5:
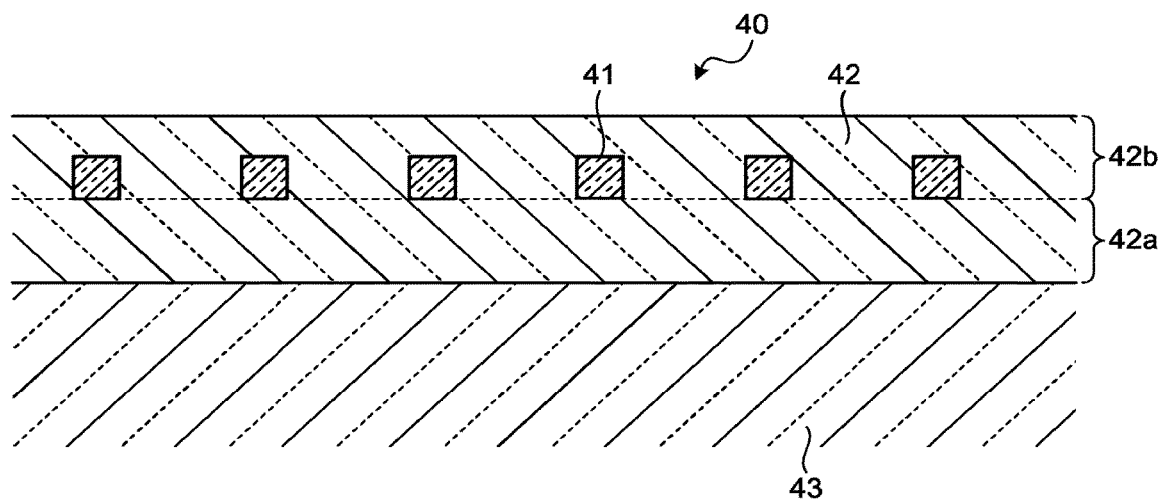
FIG. 5 is a cross-sectional view illustrating a cross section taken along line D-D in FIG. 1.

FIG. 1 is a partial cutaway view illustrating a configuration of an optical module according to a first embodiment, in which the internal structure of a tape core wire is exposed. FIG. 2 is a cross-sectional view illustrating a cross section taken along line A-A in FIG. 1; FIG. 3 is a cross-sectional view illustrating a cross section taken along line B-B in FIG. 1; FIG. 4 is a cross-sectional view illustrating a cross section taken along line C-C in FIG. 1; and FIG. 5 is a cross-sectional view illustrating a cross section taken along line D-D in FIG. 1.

As illustrated in FIG. 1, an optical module 100 according to the first embodiment includes a plurality of single-mode optical fibers 10, a plurality of high relative refractive-index difference optical fibers 20, a planar lightwave circuit 30, a silicon thin-wire waveguide 40, and a fixing member 50.

The single-mode optical fiber 10 may be an ordinary quartz glass type optical fiber having zero dispersion wavelength in the 1.3 μm band conforming to, for example, ITU-T G.652. In the single-mode optical fiber 10, a relative refractive-index difference of a core with respect to a cladding is about 0.3%, and a mode field diameter at 1550 nm is 10 to 11 μm.

Here, the relative refractive-index difference is defined as follows.

$$\Delta = \{(n_{c1} - n_c)/n_{c1}\} \times 100$$

Here, $n_{c1}$ is the maximum refractive index of the core, $n_c$ is the refractive index of the cladding, and the relative refractive-index difference is also defined for the high relative refractive-index difference optical fiber 20, the planar lightwave circuit 30, and the silicon thin-wire waveguide 40.

The high relative refractive-index difference optical fiber 20 has a larger relative refractive-index difference of the core with respect to the cladding than the single-mode optical fiber 10. Specifically, the high relative refractive-index difference optical fiber 20 is, for example, a quartz glass type optical fiber that has the relative refractive-index difference of the core with respect to the cladding is 2.0% or more and 3.0% or less, and a mode field diameter at 1550 nm is, for example, 3.0 μm or more and 5.0 μm or less. The high relative refractive-index difference optical fiber 20 has, for example, a core diameter of 3 μm to 4 μm and a cutoff wavelength λc of 1530 nm or less.

The plurality of single-mode optical fibers 10 and the plurality of high relative refractive-index difference optical fibers 20 are arranged respectively in an array, and each of the single-mode optical fibers 10 and each of the high relative refractive-index difference optical fibers 20 are fusion-spliced at a fusion point S1. The plurality of single-mode optical fibers 10 and the plurality of high relative refractive-index difference optical fibers 20 fusion-spliced at the fusion point S1 are collectively coated in the array state.

Namely, the optical fibers 10, 20 may be configured as a so-called optical fiber tape core wire 60.

As illustrated in FIGS. 2 and 3, the high relative refractive-index difference optical fiber 20 is fixed to the fixing member 50, in a state where the coating of a portion interposed between a V-shaped groove 52 provided in the fixing member 50 and an upper plate 51 included in the fixing member 50 is removed. Thereby, the relative positions of the plurality of high relative refractive-index difference optical fibers 20 with respect to the planar lightwave circuit 30 are fixed.

As illustrated in FIG. 2, the fusion point S1 between the single-mode optical fiber 10 and the high relative refractive-index difference optical fiber 20 is located outside the V-shaped groove 52. That is, only the high relative refractive-index difference optical fiber 20 is interposed between the V-shaped groove 52 and the upper plate 51. Therefore, in the present configuration, the fusion point S1 is not under stress from the V-shaped groove 52 and the upper plate 51, and a reliability of the fusion point S1 is prevented from being degraded by such stress.

As illustrated in FIG. 2, the fusion point S1 undergoes a so-called recoat. When the single-mode optical fiber 10 and the high relative refractive-index difference optical fiber 20 are fusion-spliced, a coating 11 near the fusion point S1 is peeled off. Then, a coating 12 is applied to the fusion point S1 and its vicinity after fusion splicing. The coating has substantially the same diameter as the coating 11 of the single-mode optical fiber 10.

Furthermore, a gap between the high relative refractive-index difference optical fiber 20, the V-shaped groove 52, and the upper plate 51 is filled with an adhesive B. Furthermore, the single-mode optical fiber 10 and the high relative refractive-index difference optical fiber 20 are entirely fixed to the fixing member 50 with the adhesive B from above the coating 11 and the coating 12.

As illustrated in FIGS. 1 and 4, the planar lightwave circuit 30 has a cladding 32 formed of quartz-based glass and a core 31 with a dopant for increasing the refractive index added to the quartz-based glass, and light is confined by the core 31, thereby implementing an optical waveguide for guiding the light. The optical waveguide of the planar lightwave circuit 30 is connected to the high relative refractive-index difference optical fibers 20 at a connection surface S2. Here, for the high relative refractive-index difference optical fiber 20, the connection surface S2 is one end surface opposite to the other end surface fusion-spliced to the single-mode optical fiber 10.

The relative refractive-index difference between the core 31 and the cladding 32 in the planar lightwave circuit 30 is preferably set to 4% or more and 6% or less for reasons described later. Such a relative refractive-index difference is obtained by adding, for example, zirconia ($ZrO_2$) to the core 31 in the planar lightwave circuit 30. The size of the core 31 in the planar lightwave circuit 30 is 2 μm or more and 4 μm or less in thickness and 2 μm or more and 4 μm or less in width. The mode field diameter of such a planar lightwave circuit 30 is, for example, 2 μm to 4 μm at a wavelength of 1550 nm.

Note that the mode field diameter in the planar lightwave circuit 30 and the silicon thin-wire waveguide 40 are the diameter of a point at which an optical intensity becomes 5% of the maximum optical intensity in the near-field pattern (NFP) of light that propagates through the core. When the mode field is an ellipse, an average value of the long diameter and the short diameter is taken as the mode field diameter.

An example of a method for manufacturing the planar lightwave circuit 30 is briefly described as follows. First, a substrate 33 formed of silicon, quartz glass, or the like is prepared. Next, a layer including silica ($SiO_2$) corresponding to a lower cladding 32a, which is the cladding 32 below the core 31, is formed on the substrate 33 using a plasma chemical vapor deposition (CVD) method, or the like, and then the layer is annealed to form a transparent glass.

Next, using a sputtering method, a silica ($SiO_2$) layer doped with zirconia ($ZrO_2$) is formed at a position corresponding to the core 31, and then the layer is annealed to form a transparent glass. Then, a silica ($SiO_2$) layer doped with zirconia ($ZrO_2$) is processed by a photolithography technique, an etching technique, or the like, in a desired shape corresponding to the optical waveguide, to form the core 31 having a refractive index higher than that of the cladding 32.

Thereafter, an upper cladding 32b is formed of silica ($SiO_2$) on the core 31 and the lower cladding 32a, and then the layer is annealed to form a transparent glass. With these processes, the planar lightwave circuit 30 is completed.

As illustrated in FIG. 5, the silicon thin-wire waveguide 40 is formed on a substrate 43. The silicon thin-wire waveguide 40 has a core 41, which is formed of silicon (Si), and a cladding 42 having a lower cladding 42a and an upper cladding 42b. The cladding 42 has a refractive index lower than that of the core 41, and light is confined by the core 41, thereby implementing an optical waveguide that guides the light. Note that the silicon thin-wire waveguide 40 here indicates a silicon thin-wire waveguide element or a waveguide chip, which includes an optical waveguide having the core 41 formed of silicon (Si) and the cladding 42 having the refractive index lower than that of the core 41. For example, in the silicon thin-wire waveguide 40, an optical switch, a light emitting element, or the like may be integrated on the same substrate.

The optical waveguide of the silicon thin-wire waveguide 40 is connected to the optical waveguide of the planar lightwave circuit 30 at a connection surface S3 FIG. 1). Here, for the planar lightwave circuit 30, the connection surface S3 is one end surface opposite to the other end surface connected to the high relative refractive-index difference optical fiber 20.

The relative refractive-index difference between the core 41 and the cladding 42 in the silicon thin-wire waveguide 40 is, for example, about 40%. The size and width of the core 41 in the silicon thin-wire waveguide 40 are, for example, several hundred nanometers.

The silicon thin-wire waveguide 40 is manufactured by using, for example, a complementary metal oxide semiconductor (CMOS) process. Here, the CMOS process is the same manufacturing process as a standard process for manufacturing a CMOS on a silicon substrate.

In the configuration example of the silicon thin-wire waveguide 40 above described, the core 41 is buried in the cladding 42. However, the silicon thin-wire waveguide 40 may be a waveguide such as a ridge type waveguide other than the buried type. Additionally, the material of the cladding 42 is not limited to silica ($SiO_2$), but other materials may be used. Moreover, the cladding 42 may partially include air.

Here, the relation of the relative refractive-index difference of each constitution in the optical module 100 having the above configuration will be summarized as follows. Assuming that the relative refractive-index difference of the core with respect to the cladding in the single-mode optical fiber 10 is $\Delta 1$, the relative refractive-index difference of the core with respect to the cladding in the high relative refractive-index difference optical fiber 20 is $\Delta 2$, the relative refractive-index difference of the core with respect to the cladding in the planar lightwave circuit 30 is $\Delta 3$, and the relative refractive-index difference of the core with respect to the cladding in the silicon thin-wire waveguide 40 is $\Delta 4$, $\Delta 1$ is about 0.3%, $\Delta 2$ is 2.0% or more and 3.0% or less, $\Delta 3$ is 4% or more and 6% or less, and $\Delta 4$ is about 40%. Therefore, in the relationship of the relative refractive-index difference of each constitution in the optical module 100, the relational expression below is satisfied:

$$\Delta 1 < \Delta 2 < \Delta 3 < \Delta 4.$$

Modification

Figure 6:
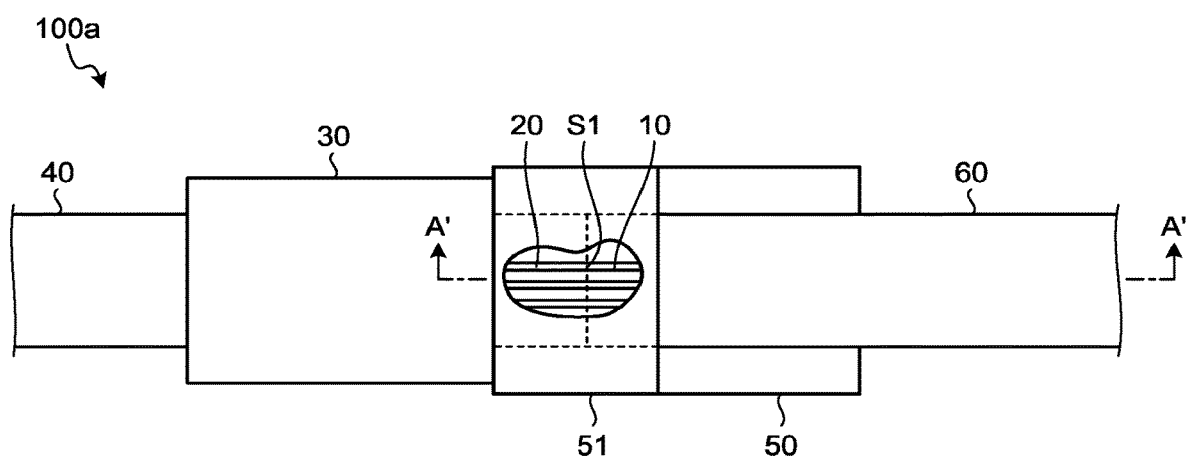
FIG. 6 is a partial cutaway view illustrating a configuration of an optical module according to a modification.
Figure 7:
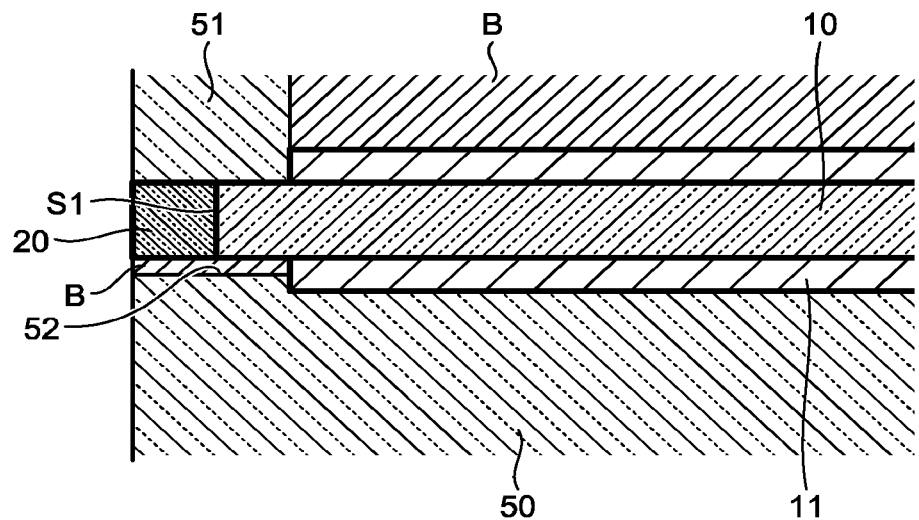
FIG. 7 is a cross-sectional view illustrating a cross section taken along line A'-A' in FIG. 6.

Here, a modification of the optical module 100 according to the first embodiment will be described with reference to FIGS. 6 and 7. FIG. 6 is a partial cutaway view illustrating a configuration of an optical module according to the modification, in which the internal structure of the tape core wire is exposed. FIG. 7 is a cross-sectional view illustrating a cross section taken along line A'-A' in FIG. 6. Since an optical module 100a according to the modification has many structures common to the optical module 100 according to the first embodiment, only different structures will be described here.

As illustrated in FIG. 6, the optical module 100a according to the modification includes the single-mode optical fiber 10, the high relative refractive-index difference optical fiber 20, the planar lightwave circuit 30, and the silicon thin-wire waveguide 40, and the fixing member 50, similarly to the optical module 100 according to the first embodiment.

Similarly, the plurality of single-mode optical fibers 10 and the plurality of high relative refractive-index difference optical fibers 20 are arranged respectively in an array, and each of the single-mode optical fibers 10 and each of the high relative refractive-index difference optical fibers 20 are fusion-spliced at the fusion point S1. The plurality of single-mode optical fibers 10 and the plurality of high relative refractive-index difference optical fibers 20 fusion-spliced at the fusion point S1 are collectively coated in the array state. Namely, the optical fibers 10, 12 may be configured as a so-called optical fiber tape core wire 60.

On the other hand, as illustrated in FIG. 7, in the optical module 100a according to the modification, the fusion point S1 is interposed between the V-shaped groove 52 provided in the fixing member 50 and the upper plate 51 included in the fixing member 50. Therefore, unlike the optical module 100 according to the first embodiment, the optical module 100a according to the modification is not recoated at the fusion point S1. That is, in the optical module 100a according to the modification, a part of the high relative refractive-index difference optical fiber 20 and a part of the single-mode optical fiber 10 are fixed to the fixing member 50. Additionally, the coating of these parts of the optical fibers 10, 20, the parts being interposed between the V-shaped groove 52 provided in the fixing member 50 and the upper plate 51 included in the fixing member 50, is removed.

With such configuration, it is preferable to perform a process such as narrowing a diameter of the fusion point S1 and its vicinity such that the stress applied thereto by the V-shaped groove 52 and the upper plate 51 does not decrease a reliability of the fusion point S1. On the other hand, in the optical module 100a according to the modified example, it is not necessary to recoat the fusion point S1, which may make the manufacturing simplified.

The optical module 100a according to the modification such as described above also has an effect similar to the optical module 100 according to the first embodiment.

Operating Principle

Here, referring to FIG. 8, the operating principle that brings about an effect that the configuration of the optical module 100 according to the first embodiment can reduce the connection loss between the single-mode optical fiber 10 and the silicon thin-wire waveguide 40 with a simple configuration will be explained.

Figure 8:
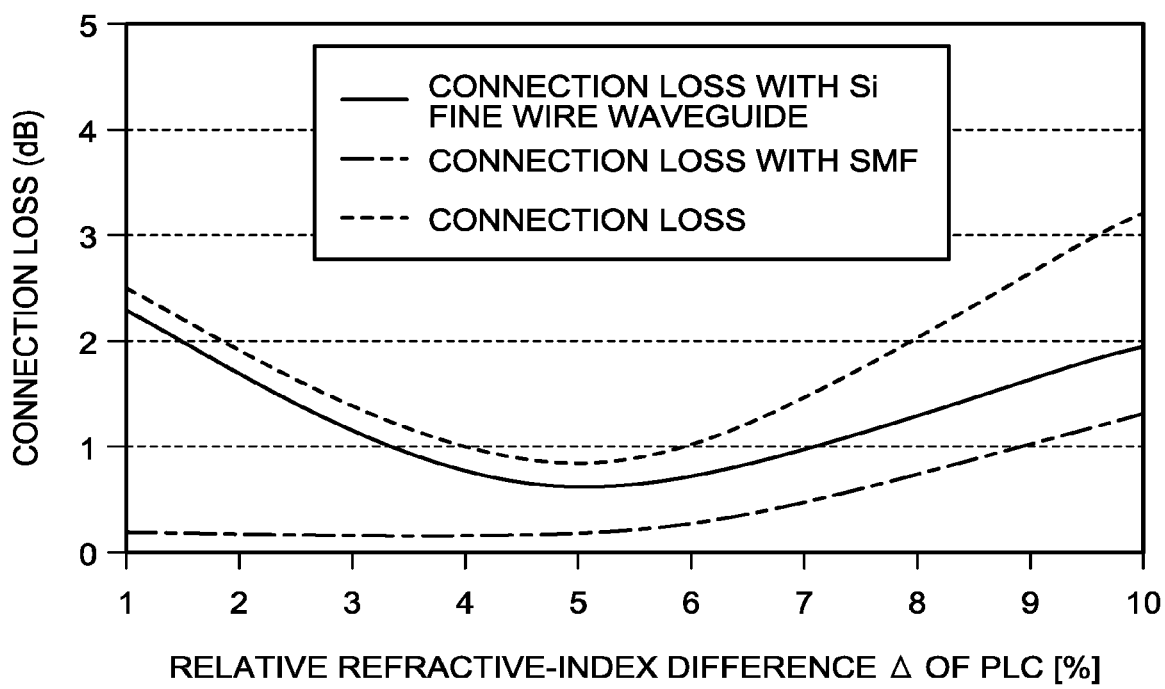
FIG. 8 is a graph illustrating the relationship between the relative refractive-index difference and the connection loss of a planar lightwave circuit in the first embodiment.

FIG. 8 is a graph illustrating the relationship between the relative refractive-index difference Δ and the connection loss of the planar lightwave circuit (PLC) in the first embodiment. In the graph illustrated in FIG. 8, a dot-and-dash line indicates a connection loss between the single-mode optical fiber (SMF) 10 and the planar lightwave circuit 30; a solid line indicates a connection loss between the silicon (Si) thin-wire waveguide 40 and the planar lightwave circuit 30; and a broken line indicates a total connection loss from the single-mode optical fiber 10 to the silicon thin-wire waveguide 40.

In the graph illustrated in FIG. 8, the connection loss is plotted in a case where optimum values are selected for other parameters in the optical module 100, with the relative refractive-index difference Δ of the planar lightwave circuit (PLC) as a variable. In addition, the connection loss illustrated in FIG. 8 is the connection loss in the endmost channel of the optical module 100 that has 40 channels, or is provided with 40 optical waveguides from the single-mode optical fiber 10 through the silicon thin-wire waveguide 40.

First, regarding the connection loss between the single-mode optical fiber 10 and the planar lightwave circuit 30 (the dot-and-dash line), the following holds.

When the relative refractive-index difference of the planar lightwave circuit is 5% or less, by selecting the high relative refractive-index difference optical fiber 20 whose mode field diameter is matched with that of the planar lightwave circuit 30, the connection loss can be reduced to about the lower limiting value.

From a viewpoint of stably manufacturing the high relative refractive-index difference optical fiber 20, the relative refractive-index difference is preferably 3% or less. A mode field diameter of the high relative refractive-index difference optical fiber 20 with such a relative refractive-index difference is about 3 μm. The relative refractive-index difference of the planar lightwave circuit capable of providing such a mode field diameter is 5%. As a result, when the relative refractive-index difference of the planar lightwave circuit is larger than 5%, a high relative refractive-index difference optical fiber whose mode field diameter is matched with that of the planar lightwave circuit cannot be selected, and the connection loss increases.

Summarizing the above, as shown by the dot-and-dash line in FIG. 8, the connection loss between the single-mode optical fiber 10 and the planar lightwave circuit 30 can be maintained at a very low state when the relative refractive-index difference of the planar lightwave circuit is 5% or less. However, when the relative refractive-index difference of the planar lightwave circuit becomes larger than 5%, the connection loss tends to gradually increase accordingly.

Next, regarding the connection loss between the silicon thin-wire waveguide 40 and the planar lightwave circuit 30 (the solid line), the following holds.

In order to splice the silicon thin-wire waveguide 40 and the planar lightwave circuit 30, a gap is required for an adhesive to enter between the silicon thin-wire waveguide 40 and the planar lightwave circuit 30. However, when the relative refractive-index difference of the planar lightwave circuit 30 becomes 5% or more, the connection loss due to this gap tends to increase.

On the other hand, as the relative refractive-index difference of the planar lightwave circuit becomes larger, it is possible to suppress the connection loss caused by the positional shift between the silicon thin-wire waveguide 40 and the planar lightwave circuit 30. The reason is that when the relative refractive-index difference of the planar lightwave circuit 30 is small, it is necessary to increase a core interval of the planar lightwave circuit 30, and the influence of warpage generated in the planar lightwave circuit becomes large. Since quartz glass is deposited on the silicon substrate in the planar lightwave circuit, warpage is generated due to the difference in a coefficient of linear expansion between silicon and quartz glass. Therefore, a larger relative refractive-index difference of the planar lightwave circuit 30 is more advantageous from the viewpoint of keeping the connection loss low.

Figure 9:
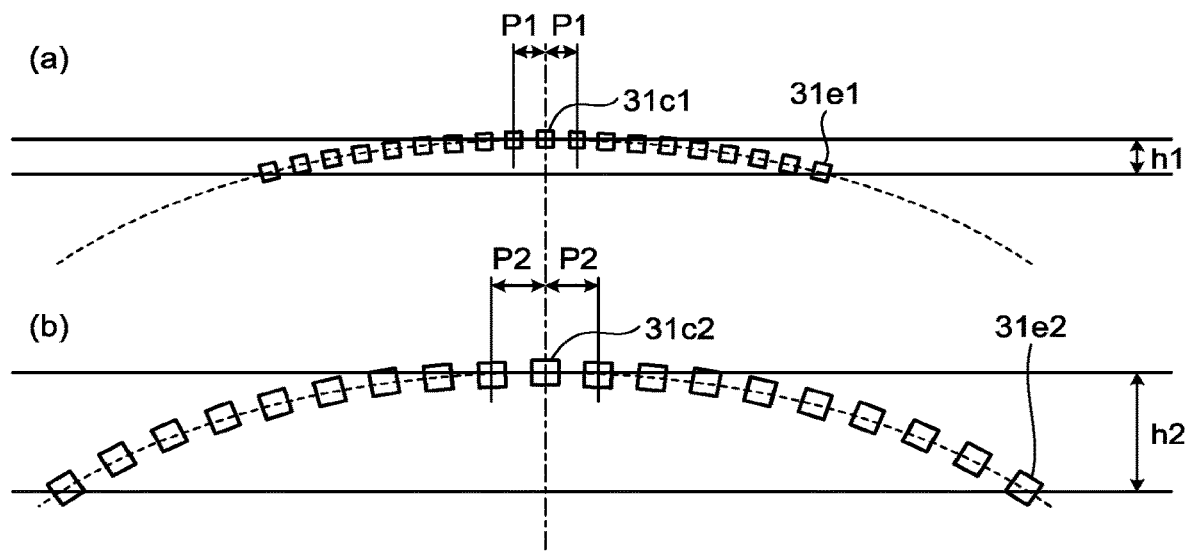
FIG. 9 is a view schematically illustrating the relationship between a core interval and a positional shift of the planar lightwave circuit.

FIG. 9 is a diagram schematically illustrating the relationship between the core interval and the positional shift of the planar lightwave circuit. FIG. 9 illustrates a comparison between a case where the core interval of the planar lightwave circuit is narrow (a) and a case where the core interval of the planar lightwave circuit is wide (b). Parts (a) and (b) indicate the position in the cross-sectional direction of the core when the same amount of warpage is generated.

As illustrated in FIG. 9, in the case where a core interval P1 of the planar lightwave circuit is narrow, a vertical shift between a center core 31c1 and an end core 31e1 is h1. In the case where a core interval P2 of the planar lightwave circuit is wide, a vertical shift between a center core 31c2 and an end core 31e2 is h2. In other words, the narrower core interval of the planar lightwave circuit is, the smaller the shift between the center and the core is suppressed.

Here, as the relative refractive-index difference of the planar lightwave circuit is larger, the mode field diameter is smaller, so that the core interval of the planar lightwave circuit can be narrowed. For example, when the relative refractive-index difference is 1.5%, it is necessary to secure a core interval of about 30 μm in order to suppress crosstalk between adjacent cores. However, when the relative refractive-index difference is 5%, the core interval can be narrowed down to 8 μm.

Summarizing the above, when considering the influence of the gap between the silicon thin-wire waveguide 40 and the planar lightwave circuit 30, it is preferable that the relative refractive-index difference of the planar lightwave circuit be small, and when considering the influence of the warpage of the planar lightwave circuit, it is preferable that the relative refractive-index difference of the planar lightwave circuit be large. From these two effects, as illustrated in the graph illustrated in FIG. 8, the minimum value of the connection loss appears around 5% of the relative refractive-index difference of the planar lightwave circuit.

The graph of the total connection loss (broken line) from the single-mode optical fiber 10 to the silicon thin-wire waveguide 40 illustrated in FIG. 8 is a connection loss obtained by combining the connection loss between the single-mode optical fiber 10 and the planar lightwave circuit 40 with the connection loss between the silicon thin-wire waveguide 40 and the planar lightwave circuit 30 described above.

As can be seen from the broken line graph in FIG. 8, the total connection loss from the single-mode optical fiber 10 to the silicon thin-wire waveguide 40 is minimized around 5% of the relative refractive-index difference of the planar lightwave circuit 30. Furthermore, in order to suppress the total connection loss from the single-mode optical fiber 10 to the silicon thin-wire waveguide 40 to 1 dB or less, the relative refractive-index difference of the planar lightwave circuit is preferably set to 4% or more and 6% or less. In the ranges where the relative refractive-index difference of the planar lightwave circuit is smaller than 4% and larger than 6%, the total connection loss from the single-mode optical fiber 10 to the silicon thin-wire waveguide 40 tends to increase almost linearly.

From the viewpoint of downsizing the entire optical module, the relative refractive-index difference of the planar lightwave circuit is preferably set to 4% or more and 6% or less. For example, when the relative refractive-index difference of the planar lightwave circuit is 1.5%, the minimum bending radius of the optical waveguide that can be formed in the planar lightwave circuit 30 is about 100 times larger than the minimum bending radius of the silicon thin-wire waveguide 40. As a result, the size of the entire optical module is substantially determined by the size of the planar lightwave circuit 30, and the advantage of the silicon thin-wire waveguide 40, which is small by nature, is reduced. Therefore, in order to enjoy the advantage of the silicon thin-wire waveguide 40 and downsize the entire optical module, the relative refractive-index difference of the planar lightwave circuit is preferably set to 4% or more and 6% or less.

Furthermore, in order to suppress the connection loss between the planar lightwave circuit 30 and the silicon thin-wire waveguide 40, it is necessary to match the mode field diameter between the planar lightwave circuit 30 and the silicon thin-wire waveguide 40. However, an enlarged mode field diameter of the silicon thin-wire waveguide 40 tends to lead to a complicated manufacturing process, resulting in an increased cost from the viewpoint of yield and tact time.

As in FIG. 5 described above, in the silicon thin-wire waveguide 40, the lower cladding 42a is laminated on the substrate 43, and the core 41 is formed on the lower cladding 42a. Here, the thickness of the lower cladding 42a is generally 2 to 3 μm. Therefore, when the mode field diameter in the silicon thin-wire waveguide 40 is made to be somewhat larger than 3 μm, absorption of propagation light (mode absorption) by the substrate 43 occurs.

As a result, when enlarging the mode field diameter in the silicon thin-wire waveguide 40, a separate manufacturing process such as hollowing out the substrate 43 under the core 41 is required, and thus the manufacturing process is complicated.

Furthermore, in multicore connection, it is difficult to fabricate the same core shapes of connecting portions of several tens to several hundreds of adjacent ports, which causes variations between the ports.

Therefore, it is more advantageous to reduce the mode field diameter of the planar lightwave circuit 30 without enlarging the mode field diameter in the silicon thin-wire waveguide 40 as much as possible. From the above viewpoint, the mode field diameter of the planar lightwave circuit 30 is preferably about 3 μm, and the relative refractive-index difference that provides this mode field diameter is preferably 4% or more and 6% or less.

Example 1

Here, an example of the optical module according to the first embodiment described above will be described. An optical module according to Example 1 is configured similarly to FIG. 1 except that the planar lightwave circuit, the high relative refractive-index difference optical fiber, and the single-mode optical fiber are connected in this order to both ends of the silicon thin-wire waveguide. Namely, this optical module has a configuration for experiment in which light input from one single-mode optical fiber at one end, is output from the other single-mode optical fiber at the opposite end.

Figure 10:
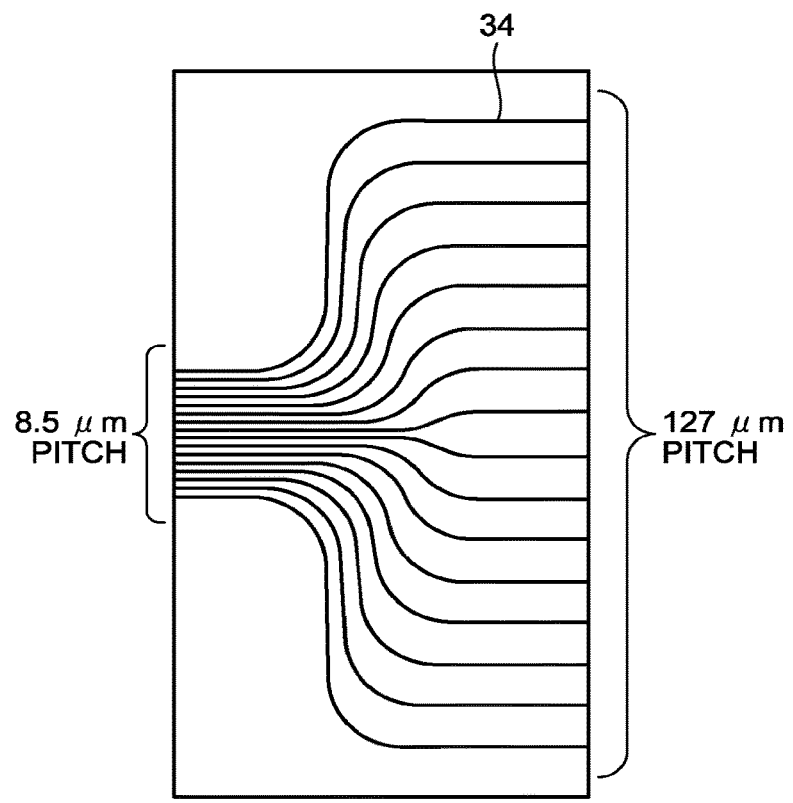
FIG. 10 is a view illustrating the planar lightwave circuit according to Example 1.

Specifically, the planar lightwave circuit of the optical module according to Example 1 is a planar lightwave circuit that serves as a pitch converter for sixteen cores, and as illustrated in FIG. 10, S-shaped waveguides 34 are arranged in parallel. The minimum value of the bending radius of the S-shaped waveguide 34 is 400 μm, a core interval at an end surface connected to the high relative refractive-index difference optical fiber is 127 μm, and a core interval at an end surface connected to the silicon thin-wire waveguide is 8.5 μm.

In addition, a size of the core in the planar lightwave circuit is 3 μm×3 μm, and the core is formed of silica ($SiO_2$) doped with zirconia ($ZrO_2$). The relative refractive-index difference between the core and the cladding of the planar lightwave circuit is 5% and a mode field diameter is 3 μm.

Note that the mode field diameter of the silicon thin-wire waveguide according to Example 1 is set to 3 μm in accordance with the mode field diameter of the planar lightwave circuit. In addition, a mode field diameter of the high relative refractive-index difference optical fiber according to Example 1 is set to 3 μm in accordance with the mode field diameter of the planar lightwave circuit. The high relative refractive-index difference optical fiber is fusion-spliced to the single-mode optical fiber, and the connection loss for this connection is about 0.05 dB.

In the optical module according to Example 1 of the above configuration, the connection loss between the planar lightwave circuit and the single-mode optical fiber is 0.3 to 0.5 dB, and the connection loss in the entire optical module is 0.9 to 1.3 dB. Therefore, in the optical module according to Example 1, the connection loss between the silicon thin-wire waveguide and the single-mode optical fiber is reduced with the simple configuration.

Example 2

An optical module according to Example 2 is a configuration example in which the planar lightwave circuit is downsized as compared with the planar lightwave circuit of the optical module according to Example 1.

Here, downsizing of the planar lightwave circuit is achieved by using waveguide design using topology optimization to reduce a minimum bending radius in the S-shaped waveguide 34 illustrated in FIG. 10 from 400 μm to 100 μm.

Figure 11:
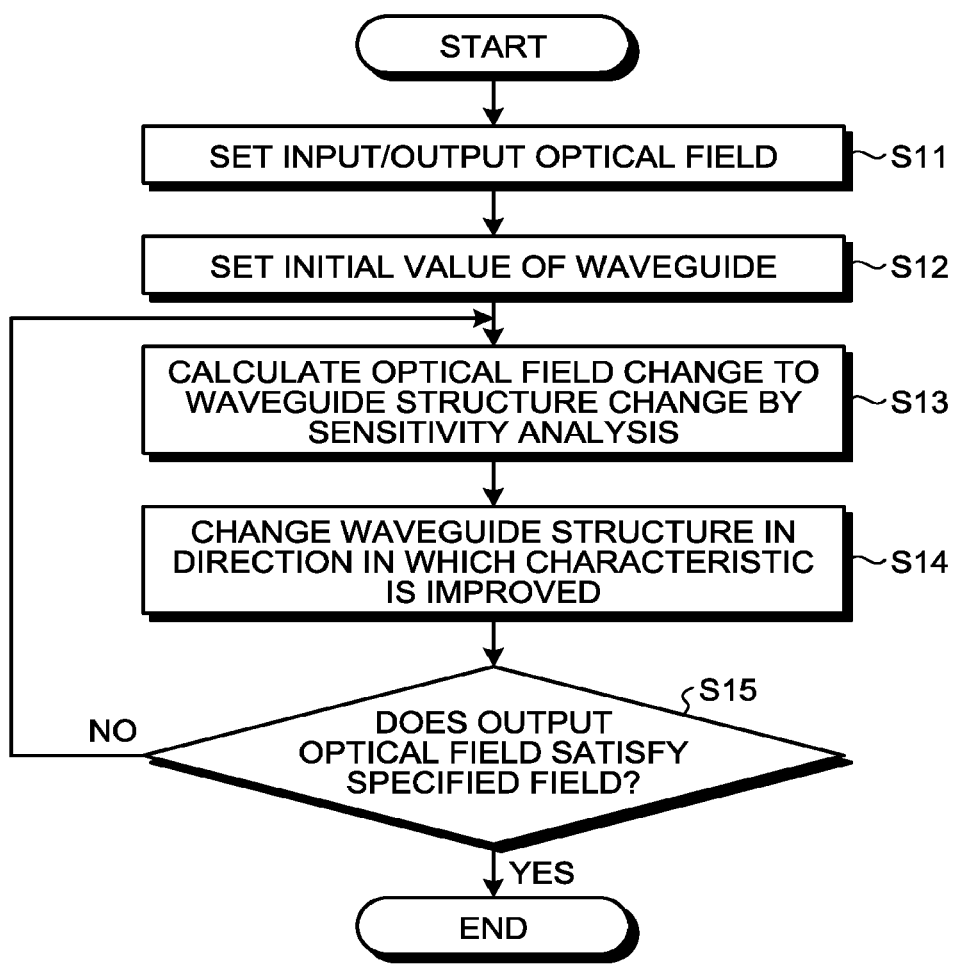
FIG. 11 is a flowchart illustrating a procedure of waveguide design using topology optimization.

The waveguide design using topology optimization refers to one of designing techniques in which the refractive index profile of the optical waveguide given as an initial value is minutely changed and the loss of the optical waveguide is calculated while repeating the minute change to specify the shape of the optical waveguide for providing a desired loss. FIG. 11 is a flowchart illustrating a procedure of the waveguide design using topology optimization.

As illustrated in FIG. 11, in the waveguide design using topology optimization, first, an optical field on the input side and an optical field on the output side are set in the waveguide to be designed (step S11). For example, here, data in which an optical field with a mode field diameter of 3 μm is input from the high relative refractive-index difference optical fiber and an optical field with a mode field diameter of 3 µm is output to the silicon thin-wire waveguide is set.

Next, an initial value of the shape of the optical waveguide from which the topology optimization is started is set (step S12). For example, here, a rough optical waveguide may be set as an initial value such that an S-shaped waveguide is implemented in which the minimum value of the bending radius is 100 µm, a core interval at an end surface connected to the high relative refractive-index difference optical fiber is 127 µm, and a core interval at an end surface connected to the silicon thin-wire waveguide is 8.5 µm.

After that, the optical waveguide analysis by the finite element method is performed, and the change of the optical field in the case where the waveguide structure (refractive index profile) is minutely changed is calculated by the sensitivity analysis (step S13). Then, the waveguide structure is changed in a direction in which the characteristic is improved, which is determined in step S13 (step S14).

By repeating the above steps S13 and S14, it is determined whether the output optical field satisfies a specified value (step S15), and the shape of the optical waveguide which provides the desired characteristic is specified.

Figure 12:
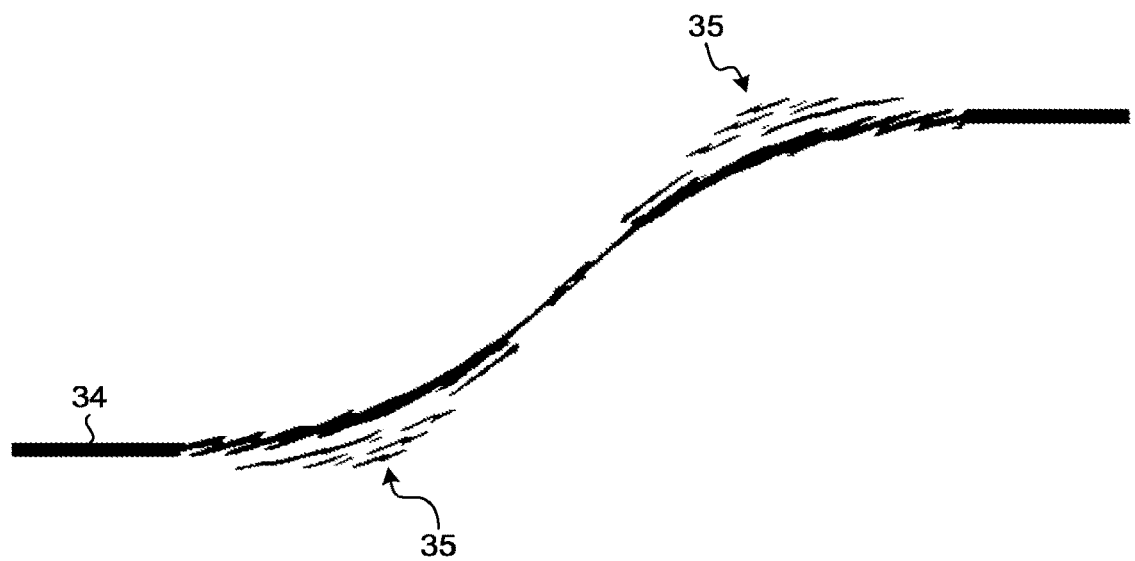
FIG. 12 is a view illustrating an example of an S-shaped waveguide by the waveguide design using topology optimization.

FIG. 12 is a view illustrating an example of an S-shaped waveguide by the waveguide design using topology optimization described above. As illustrated in FIG. 12, in the region along the outer periphery of the S-shaped waveguide 34 according to Example 2, a plurality of wrinkled auxiliary waveguides 35 are formed along the S-shaped waveguide 34. These wrinkled auxiliary waveguides 35 are responsible for returning the energy of light leaking out from the S-shaped waveguide 34, to the S-shaped waveguide 34, when propagating through the S-shaped waveguide 34, and thus contribute to suppressing the bending loss of the light propagating through the S-shaped waveguide 34.

In the planar lightwave circuit according to Example 2, as illustrated in FIG. 12, the S-shaped waveguide is used that has the plurality of wrinkled auxiliary waveguides formed along a bending portion of the S-shaped waveguide in a region along an outer periphery of the bending waveguide. With this, the bending radius of 400 µm in the planar lightwave circuit according to Example 1 can be reduced to 100 µm of the bending radius. Incidentally, an increase in bending loss is hardly observed. In the planar lightwave circuit according to Example 2, the size of 2 mm×3.5 mm in the planar lightwave circuit according to Example 1 is downsized to 1.5 mm×3.5 mm. In other words, the area ratio of the planar lightwave circuit has been reduced by ¾.

Although the waveguide design using topology optimization is used for the planar lightwave circuit according to Example 2, even if the planar lightwave circuit is designed by a wavefront matching method or other optimized design, it is possible to reduce the bending radius as in that of the planar lightwave circuit according to Example 2. In addition, by simply forming a wrinkled auxiliary waveguide along the bending waveguide in the region along the outer periphery of the bending waveguide without actually designing the waveguide using the optimized design, the auxiliary waveguide has an advantage of suppressing the bending loss of the light propagating through the bending waveguide.

Furthermore, in the planar lightwave circuit according to Example 2, the auxiliary waveguide that suppresses the bending loss is provided for the S-shaped waveguide for pitch conversion. However, the configuration is not limited to this configuration, and it is possible to provide an auxiliary waveguide that suppresses bending loss, for a general bending waveguide formed in the planar lightwave circuit.

Second Embodiment

In the first embodiment, the configuration of the optical module for multicore connection is used, but the implementation of the present invention is not limited thereto, and it can be applied to the optical module for single-core connection. Here, a configuration of an optical module according to a second embodiment, which is a single-core connection, and the characteristics of the connection loss will be described. Because the optical module according to the second embodiment is only different from the optical module according to the first embodiment in that the former has the single-core connection configuration, explanations about elements/members that are used in both embodiments will be omitted.

Figure 13:
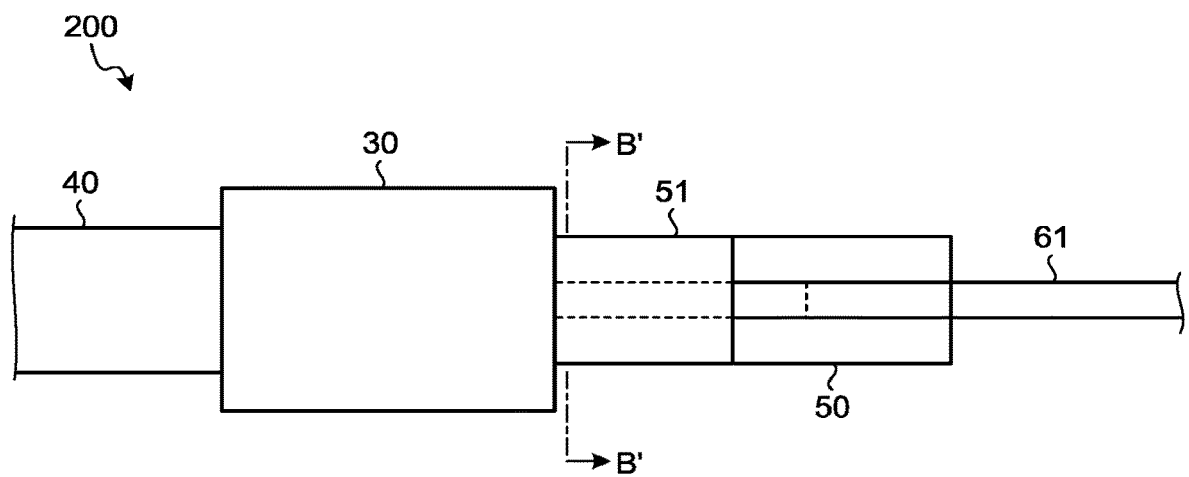
FIG. 13 is a partial cutaway view illustrating a configuration of an optical module according to a second embodiment.
Figure 14:
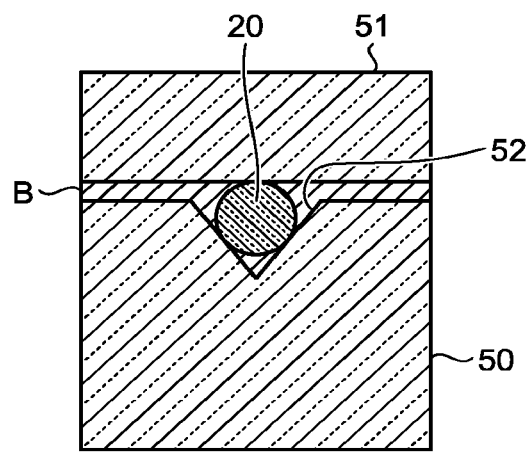
FIG. 14 is a cross-sectional view illustrating a cross section taken along line B'-B' in FIG. 13.

FIG. 13 is a partial cutaway view illustrating the configuration of the optical module according to the second embodiment, and FIG. 14 is a cross-sectional view illustrating a cross section taken along line B'-B' in FIG. 13.

As illustrated in FIG. 13, an optical module 200 according to the second embodiment includes, similarly to the optical module 100 according to the first embodiment, a single-mode optical fiber, a high relative refractive-index difference optical fiber, the planar lightwave circuit 30, and the silicon thin-wire waveguide 40, and the fixing member 50. In FIG. 13, an optical fiber core wire 61 coated in a state where the single-mode optical fiber and the high relative refractive-index difference optical fiber are fusion-spliced is illustrated. Inside the optical fiber core wire 61, the single-mode optical fiber and the high relative refractive-index difference optical fiber are housed.

As illustrated in FIG. 14, also in the optical module 200 according to the second embodiment, as in the first embodiment, the high relative refractive-index difference optical fiber 20 is fixed to the fixing member 50, in a state where the coating of a portion interposed between the V-shaped groove 52 provided in the fixing member 50 and the upper plate 51 included in the fixing member 50 are removed. Thereby, the relative position of the high relative refractive-index difference optical fiber 20 with respect to the planar lightwave circuit 30 is fixed.

Figure 15:
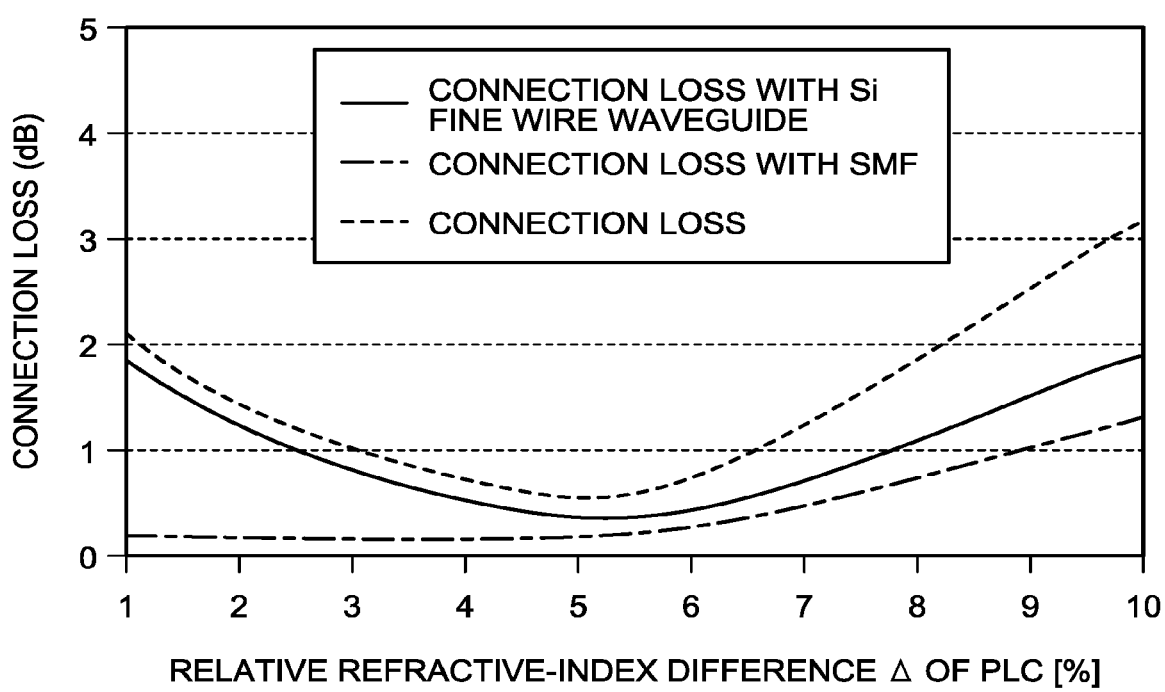
FIG. 15 is a graph illustrating the relationship between the relative refractive-index difference and the connection loss of the planar lightwave circuit in the second embodiment.

FIG. 15 is a graph illustrating the relationship between the relative refractive-index difference Δ and the connection loss of the planar lightwave circuit (PLC) in the second embodiment. In the graph illustrated in FIG. 15, a dot-and-dash line indicates the connection loss between the single-mode optical fiber (SMF) and the planar lightwave circuit; a solid line indicates the connection loss between the silicon (Si) thin-wire waveguide and the planar lightwave circuit; and a broken line indicates a total connection loss from the single-mode optical fiber to the silicon thin-wire waveguide are described.

As can be seen from the dot-and-dash line illustrated in the graph of FIG. 15, in the optical module according to the second embodiment, the connection loss between the single-mode optical fiber and the planar lightwave circuit can be maintained at a very low level when the relative refractive-index difference of the planar lightwave circuit is 5% or less. However, when the relative refractive-index difference of the planar lightwave circuit becomes larger than 5%, the connection loss tends to gradually increase accordingly.

This is because even in the optical module according to the second embodiment, as in the first embodiment, in order to stably manufacture the high relative refractive-index difference optical fiber, it is preferable to suppress the relative refractive-index difference to 3% or less. As a result, when the relative refractive-index difference of the planar lightwave circuit is larger than 5%, a high relative refractive-index difference optical fiber whose mode field diameter is matched with that of the planar lightwave circuit cannot be selected and the connection loss increases.

Furthermore, as can be seen from the solid line in the graph illustrated in FIG. 15, in the optical module according to the second embodiment, for the connection loss between the silicon thin-wire waveguide and the planar lightwave circuit, the minimum value of the connection loss appears around 5% of the relative refractive-index difference of the planar lightwave circuit.

This is because even in the optical module according to the second embodiment, as in the first embodiment, when considering the influence of the gap between the silicon thin-wire waveguide and the planar lightwave circuit, the relative refractive-index difference of the planar lightwave circuit is preferably small, and when considering the influence of mode absorption in the substrate, it is preferable to set the mode field diameter of the silicon thin-wire waveguide to 3 μm or less.

As described above, when the mode field diameter in the silicon thin-wire waveguide 40 is made to be larger than 3 μm, absorption of propagation light (mode absorption) by the substrate 43 occurs. Therefore, when enlarging the mode field diameter in the silicon thin-wire waveguide 40, it becomes necessary to perform a separate manufacturing process such as hollowing out the substrate 43 under the core 41 after the CMOS process, which complicates the manufacturing process. Therefore, in order to form the silicon thin-wire waveguide 40 only by the CMOS process, it is preferable to set the mode field diameter of the silicon thin-wire waveguide 40 to 3 μm or less. In order to suppress the connection loss with the silicon thin-wire waveguide 40 having a mode field diameter of 3 μm or less, the relative refractive-index difference of the planar lightwave circuit 30 is preferably 5% or more.

From these two effects, as illustrated in the graph of FIG. 15, the minimum value of the connection loss appears around 5% of the relative refractive-index difference of the planar lightwave circuit 30.

The graph of the total connection loss (broken line) from the single-mode optical fiber to the silicon thin-wire waveguide 40 illustrated in FIG. 15 is the combination of the above two connection losses, and the minimum value of the connection loss appears around 5% of the relative refractive-index difference of the planar lightwave circuit 30. Therefore, also in the optical module 200 according to the second embodiment, as in the first embodiment, the relative refractive-index difference of the planar lightwave circuit 30 is preferably set to 4% or more and 6% or less.

Although the present invention has been described based on the embodiments and modifications, the present invention is not limited by the above embodiments and modifications. It is also included in the present invention that the constituent elements of the above embodiments are appropriately combined. Further effects and modifications can be easily derived by those skilled in the art.

For example, in addition to the configurations of the above embodiments, it is also possible to further improve the matching of the mode field diameter by providing a spot size converter that converts the spot size of light to be guided, on the end surface with respect to the high relative refractive-index difference optical fiber or the end surface with respect to the silicon thin-wire waveguide in the planar lightwave circuit. In addition to the configurations of the above embodiments, it is also possible to further improve the matching of the mode field diameter by providing the spot size converter, on the end surface with respect to the planar lightwave circuit in the silicon thin-wire waveguide. Additionally, the connection loss between the silicon thin-wire waveguide and the single-mode optical fiber is further reduced if the matching of the mode field diameter is further improved by these measures.

As described above, the broader aspects of the present invention are not limited to the above embodiments and modifications, and various further modifications are possible.

The optical module according to the present invention has an advantage that the connection loss between the silicon thin-wire waveguide and the single-mode optical fiber can be reduced with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical module comprising:
   a single-mode optical fiber;
   a high relative refractive-index difference optical fiber having a larger relative refractive-index difference of a first core with respect to a first cladding than a relative refractive-index difference in the single-mode optical fiber, wherein the high relative refractive-index optical fiber is fusion-spliced at a first end surface thereof to the single-mode optical fiber;
   a planar lightwave circuit including an optical waveguide having a second core formed of quartz-based glass doped with a refractive index raising dopant and a second cladding formed of quartz-based glass, thereby to guide light through the second core, wherein the optical waveguide is optically connected at a first end thereof to a second end surface of the high relative refractive-index difference optical fiber, the second end surface being opposite to the first end surface of the relative refractive-index difference optical fiber; and
   a silicon thin-wire waveguide element including a silicon thin-wire waveguide having a third core formed of silicon and a third cladding having a refractive index lower than the refractive index of the third core, thereby to guide light through the third core, wherein the silicon thin-wire waveguide is optically connected to a second end surface of the optical waveguide of the planar lightwave circuit, the second end surface being opposite to the first end surface of the optical waveguide of the planar lightwave circuit.

2. The optical module according to claim 1, wherein a relationship below is satisfied:

$$\Delta 1 < \Delta 2 < \Delta 3 < \Delta 4$$

wherein $\Delta 1$ represents a relative refractive-index difference of a core with respect to a cladding in the single-mode optical fiber;
   $\Delta 2$ represents a relative refractive-index difference of the first core with respect to the first cladding in the high relative refractive-index difference optical fiber;
   $\Delta 3$ represents a relative refractive-index difference of the second core with respect to the second cladding in the optical waveguide of the planar lightwave circuit; and
   $\Delta 4$ represents a relative refractive-index difference of the third core with respect to the third cladding in the silicon thin-wire waveguide.

3. The optical module according to claim 1, wherein the relative refractive-index difference Δ3 of the optical waveguide of the planar lightwave circuit is 4%≤Δ3≤6%.

4. The optical module according to claim 1, wherein the refractive index raising dopant is zirconia.

5. The optical module according to claim 1, wherein an auxiliary waveguide that suppresses bending loss of light propagating through a bending waveguide is formed in a region along an outer periphery of the bending waveguide in the optical waveguide of the planar lightwave circuit.

6. The optical module according to claim 1, wherein the optical waveguide of the planar lightwave circuit has a shape specified as providing a desired loss by minutely changing a shape of an optical waveguide given as an initial shape and calculating a loss of the optical waveguide while repeating the minute change.

7. The optical module according to claim 1, wherein a plurality of the single-mode optical fibers and a plurality of the high relative refractive-index difference optical fibers are optically connected to corresponding ones of a plurality of the optical waveguides of the planar lightwave circuit in a state of being arranged in an array.

8. The optical module according to claim 7, further comprising:
  a fixing member that has V-shaped grooves provided thereon, the V-shaped grooves housing corresponding ones of the plurality of high relative refractive-index difference optical fibers, thereby to define relative positions of the plurality of high relative refractive-index difference optical fibers with respect to the planar lightwave circuit; and
  an upper plate to be combined with the fixing member,
  wherein a coating of each of the high relative refractive-index difference optical fibers is partially remove, and
  each of the high relative refractive-index difference optical fibers is housed at a portion where the coating is partially removed in the V-shaped grooves, and interposed between the fixing member and the upper plate.

9. The optical module according to claim 7, wherein at least one of the plurality of optical waveguides of the planar lightwave circuit has an S-shape in planar view, and
  an interval between the second cores is narrower at the second end surface optically connected to the silicon thin-wire waveguide element than at the first end surface optically connected to the second end surface of the high relative refractive-index difference optical fiber.

10. The optical module according to claim 1, wherein the planar lightwave circuit or the silicon thin-wire waveguide element includes a spot size converter that converts a spot size of light to be guided.

* * * * *